June 13, 1961 R. J. PETERSON 2,988,203
FORCED FEED GRAIN AUGER
Filed Dec. 4, 1958
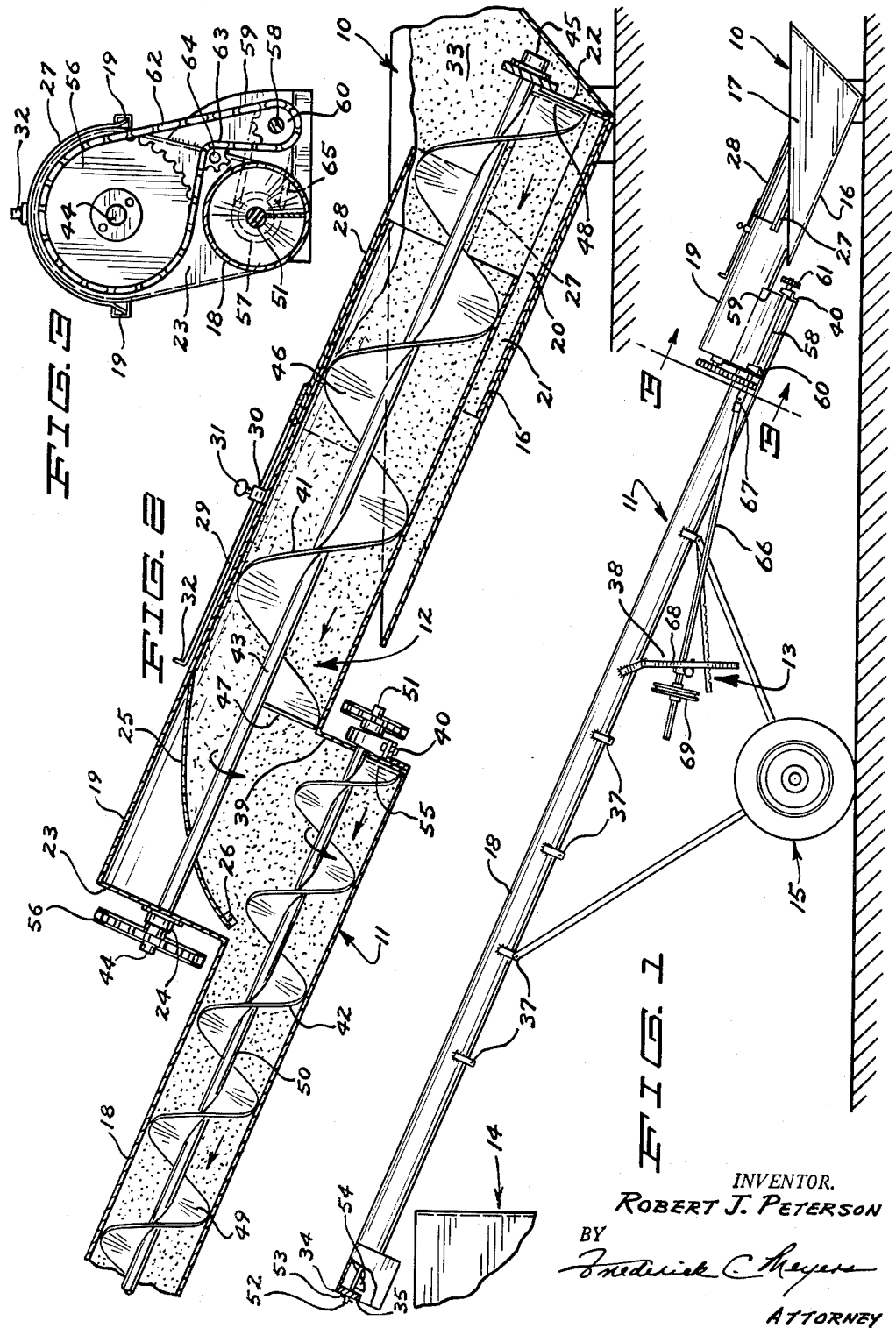
INVENTOR.
ROBERT J. PETERSON
BY
Frederick C. Meyers
ATTORNEY … # 2,988,203
FORCED FEED GRAIN AUGER
Robert J. Peterson, 117 S. 5th St., Warren, Minn.
Filed Dec. 4, 1958, Ser. No. 778,124
7 Claims. (Cl. 198—213)

This invention relates to grain conveying devices, and more particularly to an improved auger-type conveyor.

It is an important object of the invention to provide a grain conveyor which will move a greater amount of grain for its size and power requirements than will conventional auger conveyors. The ordinary grain conveyor has a single long flight which rotates within a conveyor tube. A hopper feeds grain to the lower end and a delivery spout is associated with the upper end of the tube. The auger is driven through a connection with the upper end of the conveyor flight and the rate of rotation is limited by the ability of the lower end thereof to engage and frictionally elevate the grain. Increasing the rate of rotation will not gain a proportionate increase in the capacity of the conveyor since the centrifugal force imparted by the outer edge of the auger delays the entrapment of a portion of the grain in the hopper. Such increase will, however, increase the wear on the moving parts and in some instances will cause harmful flapping of the auger against the inner walls of the conveyor tube. The present invention contemplates increasing the speed of rotation of an auger of comparable size in such a manner as to greatly increase the capacity without the noted disadvantages which accompany an increase of speed in the conventional conveyor.

Another object of the invention is to provide an improved bearing and drive assembly which permits driving of the conveyor auger from a position close to the ground rather than from a precarious upper position.

A further object of the invention is to provide an efficient auger conveyor for elevating grain which will be easily controlled to deliver an optimum high capacity of grain through a forced feeding system.

These and other objects and advantages of my invention will more fully appear from the following description, made in connection with the accompanying drawings, wherein like reference characters refer to the same parts throughout the several views and in which:

FIGURE 1 is a side elevation of my grain conveyor as assembled for use, portions being segmentally cut away for clarity;

FIGURE 2 is an enlarged vertical section of the lower portion of my grain conveyor as it appears during operation; and FIGURE 3 is an enlarged vertical section taken on the line 3—3 of FIGURE 1.

With continued reference to the drawing, the general elements of my grain conveyor comprise a hopper 10 from which grain is force-fed through a continuous housing 11 by conveyor means 12 driven through drive 13 so as to be discharged into a receiving bin or container 14, as shown in FIGS. 1 and 2. The conveyor may be appropriately supported by wheeled framework 15 which assists in transporting and locating the conveyor in conventional manner.

The feed hopper 10 may be of conventional structure having an angulated bottom 16 and sloping side walls 17. The grain itself is usually dumped into the feed hopper 10 from such sources as dump wagons and the like which form no part of the present invention.

My invention is particularly directed to the divided or split construction of the conveyor which permits force-feeding of the main conveyor portion through a drive which may be conveniently located at the lower position 13, as shown. The continuously enclosed housing 11 has an elongated upper tubular portion 18 and a shorter lower tubular portion 19 which overlap at their respective lower and upper ends to effect the continuously enclosed structure. The larger diametered tube 19 has a feed opening 20 which is adapted to lie within the feed hopper 10 as shown in FIGS. 1 and 2. A framework 21 is rigidly secured to the underside of tube 19 and extends rearwardly of the feed opening 20 to terminate in a bearing bracket 22, as shown in FIG. 2. The upper end of the short tube 19 is enclosed at 23 and is provided with a bearing 24 which is in alignment with the bearing 22 axially of the tube 19. A curved baffle plate 25 is secured within the upper portion of tube 19 and terminates downwardly at 26, as shown. Guide members 27 are secured to the sides of lower tube 19 and extend rearwardly of the feed opening 20 in a manner similar to the member 16. An arcuate shield member 28 overlies the lower end of tube 19 and is guidedly reived in the guide members 27 along the length thereof.

Shield 28 is provided with a forward rod extension 29 which, in turn, is guidedly received by bracket 30 which, in turn, has an abutment stop member such as wing nut 31 threadedly received thereby and capable of bearing against the rod 29 for holding the shield 28 in adjusted position. Rod 29 may be provided at its forward end with a handle such as the upturned end 32. When the shield 28 is adjusted rearwardly, grain 33 will be partially shielded from the feed inlet 20 and, hence, the rate of the feeding will be roughly controlled thereby. On the other hand, when the shield 28 is adjusted forwardly, the feed opening 20 will be exposed to a greater degree, thereby enhancing the rate of feed.

The elongated upper tubular portion 18 of the enclosed housing 19 is provided with a closed upper end 34 having an axial bearing 35, as shown in FIG. 1. Just rearwardly of bearing 35 is a discharge spout 36 which overlies the receiving bin 14. The elongated tube 18 may be provided with a series of brackets 37 for adjustably securing to the wheeled framework 15 to achieve various angulated positions of the entire conveyor as desired. Also carried by the elongated tube 18 and wheeled frame-work 15 is the drive bearing support 38.

The lower end of elongated tube 18 is closed off by wall 39 and, in turn, provided with a bearing 40 disposed in axial alignment with tube 18 and upper bearing 35. Although the lower tubular portion 19 and upper tubular portion 18 have respective closed ends 23 and 39, they are nevertheless joined in overlapping or off-set relation at their end portions so that communication between them is established without interrupting the enclosed nature of the entire housing.

Within the housing 11 is disposed the conveying means 12 which, in turn, comprises a pair of flight segments or augers 41 and 42. The flight segment 41 is shorter than segment 42 and lies within the tubular portion 19, as shown in FIG. 2. Flight segment 41 has a shaft 43 with a forwardly extending portion 44 received in the bearing 24 at the upper closed end 23 of the tubular portion 19. The lower end of the shaft 43 extends through the bearing 22 at 45 and, in normal operation, lies within the mass of grain 33. The segment 41 is provided with a helical flight 46 which terminates forwardly in edge 47 approximately in alignment with the closed end 39 at the bottom of elongated tube 18. The lower edge 48 of flight 46 terminates adjacent the bracket bearing 22, as shown.

Lying within the elongated tube 18 is the longer flight segment 49 which is provided with an axial shaft 50 extending at its lower end 51 through the closed end 39 of tube 18 and is permitted to slide in endwise movement in the bearing 40. At its upper end 52, the shaft 50 is received in bearing 35 and is provided with abutment means such as key 53 to suspend the flight segment 42 against downward pull during use. The upper edge 54 of the flight 49 lies adjacent the bearing 35 and overlies the discharge spout 36, as shown in FIG. 1. The lower edge 55 of flight 49 terminates adjacent the closed end 39 and, hence, the flight 49 underlies the portion of lower tube 19 which communicates with the upper tube 18.

In order to rotate the flight segments, the drive 13 is connected therewith. The extension 44 of shaft 43 is provided with a sprocket wheel 56, as shown in FIG. 3. Similarly, the lower end 51 of shaft 50 is provided with the sprocket wheel 57. A jack shaft 58 is journalled in bracketed bearings 59 secured to the housing 18 as shown in FIG. 3, and is, in turn, provided with sprockets 60 and 61, respectively. Sprocket 60 drives the sprocket wheel 56 by means of chain drive 62 which passes therearound and is directed over an idler sprocket 63 journalled on a stub shaft 64 secured to housing 11 at the closed end plate 23. The sprocket wheel 61 drives the wheel 57 through the chain drive 65, as shown in FIG. 3. The jack shaft 58 connects with the drive shaft 66 through a universal joint 67 and is journalled in bearing 68 which forms a part of the bearing framework 38. A sheave 69 is secured to shaft 66 and is adapted to be rotated by a power source such as a gasoline engine (not shown). It will be noted that the drive assemblage 13 is located at a low position with respect to the wheeled framework 15 and the enclosed housing 11 as opposed to the conventional practice of driving the auger at an upper position.

The operation of my grain conveyor will be easily understood from the foregoing description. Grain 33 is continuously fed into hopper 10 with the shield 28 adjusted so as to give adequate feed through the feed opening 20. Sprockets 60 and 61 may be substantially the same in diameters, as seen in FIGURES 1 and 3, and may be connected to a large sprocket 56 and a small sprocket 57 respectively. In such arrangement, a higher speed will be imparted to sprocket 57 (and consequently to flight segment 42) than is imparted to sprocket 56 (and flight segment 41). Lower flight segment 41 operates at a speed which will not centrifugally throw grain 33 away from the feed opening 20, but, rather, will draw it into the shorter and larger tubular portion 19 through which it is raised by the flight 46. The grain is then forced against baffle 25 as shaft 43 rotates in the direction of the arrow. Since shaft 43 passes through shield 25 and since the juncture between shield 25 and the tube 19 may permit small amounts of grain to pass through the shield, the lower edge 26 is spaced slightly forwardly of the end plate 23 as shown in FIG. 2. Thus, any grain trapped between shield 25 and the tube 18 may trickle down into tube 18. In the arrangement shown, the flight segment 42 rotates in the same direction with flight segment 41 and grain is transferred from the tubular portion 19 to tubular portion 18. Now, however, since the entire housing 11 is enclosed and tube 18 is of a smaller diameter than tube 19, the grain in its transfer will be force-fed to flight segment 42. As a consequence, the capacity of tubular portion 18 is greatly increased for the diameter of the flight 49, and increase in the rate of rotation of jack shaft 58 will cause a proportionate increase in force-feeding so as to maintain the tubular portion 18 supplied with the optimum amount of grain at all times. Thus, the capacity of the main tubular portion 18 is greatly increased over the capacity of a conventional single flight conveyor of the same diameter and the efficiency of the device for each thousand bushels of grain transferred is considerably greater. My novel arrangement also makes possible the lower location of the drive 13 which decreases the cost of the driving mechanism and increases the safety factor because of the lower center of gravity employed.

It will, of course, be understood that various changes may be made in the form, details, arrangements and proportions of the parts without departing from the scope of my invention as set forth in the appended claims.

What I claim is:

1. A grain conveyor comprising a continuously enclosed housing having an elongated upper tubular portion terminating upwardly in a discharge spout and a shorter lower tubular portion substantially in alignment with the upper and terminating downwardly in a feed opening, conveyor means having flight segments rotatably mounted respectively within the upper and lower portions of said continuously enclosed housing, each of said flight segments having a diameter corresponding substantially to that of its associated tubular portion, the upper flight segment having a smaller diameter than the lower, and drive mechanism for rotating said conveyor means whereby, during use, grain will be force-fed from the lower to the upper portions of said housing.

2. A grain conveyor comprising an upper elongated cylindrical conveyor tube terminating upwardly in a discharge spout, a short lower cylindrical conveyor tube of relatively greater diameter communicating therewith in general alignment and terminating downwardly in a feed opening, an elongated auger rotatably carried within the elongated conveyor tube, a relatively shorter and wider auger carried within the lower conveyor tube, means adapted to direct grain into said feed opening, and a common drive for rotating both of said augers whereby grain will be transferred by forced feeding from the shorter to the longer auger.

3. A grain conveyor comprising a continuously enclosed housing having an elongated upper tubular portion terminating upwardly in a discharge spout and a shorter lower tubular portion in general alignment with the upper and of relatively greater inside diameter terminating downwardly in a feed opening, conveyor means having flight segments rotatably mounted respectively within the upper and lower portions of said continuously enclosed housing and traversing the respective diameters thereof, the lower flight segment having a portion in forced feeding communication with the respective upper flight segment at said feed opening and a portion extending downwardly beyond said feed opening, and a baffle plate overlying the lower flight extension, said baffle plate being adjustable to uncover a pre-selected length of the extension and thereby control the rate of feed of grain into the feed opening.

4. A grain conveyor comprising an upper elongated cylindrical conveyor tube terminating upwardly in a discharge spout, a short lower cylindrical conveyor tube of relatively greater diameter communicating therewith and terminating downwardly in a feed opening, the lower end of the upper tube and the upper end of the lower tube being closed but communicating in laterally off-set and generally aligned relation, an elongated auger rotatably carried within the elongated conveyor tube and having a drive shaft extending rotatably through the lower end thereof, a relatively shorter and wider auger carried within the lower conveyor tube and having a drive shaft extending rotatably through the upper end thereof, a curved baffle plate positioned within the short lower tube above the upper end of said relatively shorter and wider auger and adapted to smoothly transfer grain from the lower to the upper of the off-set tubes, and a common drive connecting with both of said drive shaft extensions for simultaneously rotating the augers whereby the shorter will force-feed the longer.

5. A grain conveyor comprising an upper elongated cylindrical conveyor tube terminating upwardly in a discharge spout, a short lower cylindrical conveyor tube of relatively greater diameter communicating in substantial alignment therewith and terminating downwardly in a feed opening, an elongated auger rotatably carried within the elongated conveyor tube and having a shaft extending rotatably through the lower end of said upper tube and extending rotatably through the upper end thereof and being suspended thereby, a relatively shorter and wider auger carried within the lower conveyor tube, means adapted to direct grain into said feed opening, and drive means for rotating both of said augers for transferring grain by forced feeding from the shorter to the longer auger, the latter being driven through its lower shaft extension.

6. A forced feed grain conveyor comprising an elongated tube terminating upwardly in a discharge spout, a substantially shorter tube secured in off-set relation to said elongated tube, said shorter tube being diametrically larger than said elongated tube and further having a common opening with said elongated tube adapted for communication of grain from said shorter tube to said elongated tube, conveying means disposed within each of said tubes, and means for driving said conveying means within said shorter tube at a rotational speed less than that of the conveying means within said elongated tube, whereby the speed and capacity of said elongated tube may be increased over that which may be attained without co-operative feeding from said shorter tube.

7. A grain conveyor comprising a continuously enclosed housing having an elongated upper tubular portion terminating upwardly in a discharge spout, a substantially shorter lower tubular portion secured in spaced and parallel relation to said elongated tubular portion and terminating downwardly in a feed opening, said shorter tube also being diametrically larger than said elongated tube, conveyor means disposed in each of said elongated and shorter tubes, and drive means differentially connected to said conveyor means whereby to drive said conveyor means in said elongated tubular portion in substantially greater rotational speed than said conveyor means in said shorter tube such that grain will be force-fed at high capacity from said shorter tubular portion to said elongated tubular portion.

References Cited in the file of this patent

UNITED STATES PATENTS

| | | |
|---|---|---|
| 1,267,681 | Martin | May 28, 1918 |
| 2,308,075 | Hahn | Jan. 12, 1943 |
| 2,516,360 | Adams | July 25, 1950 |

FOREIGN PATENTS

| | | |
|---|---|---|
| 521,031 | Canada | Jan. 24, 1956 |